Figure 1:
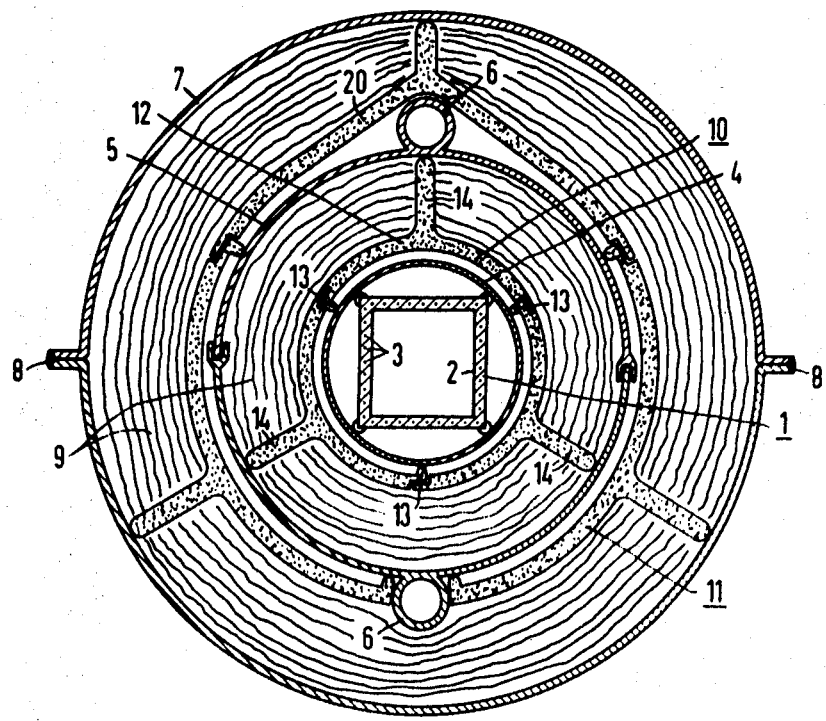

United States Patent

[11] 3,604,832

[72] Inventors Hubert Köhler;
 Fritz Schmidt, both of Erlangen, Germany
[21] Appl. No. 57,085
[22] Filed July 22, 1970
[45] Patented Sept. 14, 1971
[73] Assignee Siemens Aktiengesellschaft
 Berlin, Germany
[32] Priority July 25, 1969
[33] Germany
[31] P 19 37 795.8

[54] COAXIAL ARRANGEMENT OF TUBULAR MEMBERS, AND SPACER STRUCTURE FOR SUCH ARRANGEMENTS
 10 Claims, 2 Drawing Figs.

[52] U.S. Cl. .................................................. 174/15,
 174/DIG. 6, 174/28
[51] Int. Cl. .................................................. H01b 7/34
[50] Field of Search ............................................ 174/28, 29,
 15, 15 R, DIG. 7; 138/114, 115

[56] References Cited
 UNITED STATES PATENTS

| | | | |
|---|---|---|---|
| 3,390,703 | 7/1968 | Matlow ........................ | 138/114 |
| 3,501,581 | 3/1970 | Edwards ...................... | 174/15 |
| 3,512,581 | 6/1970 | Lawton ........................ | 174/15 X |
| 3,529,071 | 9/1970 | Kafka .......................... | 174/15 |

Primary Examiner—Lewis H. Myers
Assistant Examiner—A. T. Grimley
Attorneys—Curt M. Avery, Arthur E. Wilfond, Herbert L. Lerner and Daniel J. Tick ABSTRACT: A coaxial arrangement for coolable cables or the like, comprises inner and outer tubular members which form a longitudinally extending, annular interspace between each other, one or both these members being contactable by coolant passing through the cable during operation. The annular interspace is secured by longitudinally spaced spacer structures of poor heat-conducting material. Each of the spacer structures is in contact with the respective tubular members at only small areas and has a ring portion surrounding the inner tubular member when in assembled condition. The ring-shaped portion has inwardly directed and angularly spaced bosses or little protrusions which face and contact the inner tubular member when the arrangement is in assembled condition. Three spoke members are joined with and protrude in a radially outward direction from the ring portion so as to engage the outer tubular member of the arrangement when assembled. The three spoke members are 120° peripherally spaced from each other. Each spacer structure is composed of a plurality, preferably three component members, each component member carrying one of the three spoke members.

PATENTED SEP 14 1971  3,604,832

COAXIAL ARRANGEMENT OF TUBULAR MEMBERS, AND SPACER STRUCTURE FOR SUCH ARRANGEMENTS

Our invention relates to coaxial arrangements of tubular members for cryogenically or otherwise coolable cables or the like. In a more particular aspect, our invention concerns a spacer structure of poor heat-conducting material for maintaining in such coaxial arrangements the required annular and longitudinally extending interspace between inner and outer tubular member, the space structure being such as to contact the tubular members at only small areas of their respective wall surfaces.

Deeply cooled, particularly superconducting cables offer considerable advantages for the transmission of high quantities of electrical energy. The electrical conductors of such cables may consist of electrically normal conductivity and preferably highly pure metals, for example high-purity aluminum, whose ohmic resistivity is considerably smaller at low temperature than at normal room temperature (20°C.). Especially well suitable for such cables are superconducting metals whose ohmic resistance completely vanishes when cooling the conductor to a temperature below a critical temperature depending upon the particular superconductor material being used. Suitable as superconducting materials for such purposes are particularly the metals niobium and lead as well as the so-called high-field superconducting materials, for example superconducting alloys of niobium and titanium, or niobium and zirconium, as well as such superconducting compounds as niobium-tin ($Nb_3Sn$). For electrical stabilization, the superconductors may be joined with electrically parallel-connected metals that exhibit electrically normal conductivity at the operating temperature of the superconductors, the parallel-connected normal conductivity metals being in good electrically and good thermally conducting contact with the superconductors for which purpose the superconductors may be embedded in the normal conductivity metals.

Conductors of electrically normal conductivity metals are cooled preferably with liquids whose boiling temperature is below approximately 150° K., such as liquid hydrogen, liquid nitrogen, liquid natural (earth) gas or cold gases of correspondingly low temperatures. The cooling of superconductors, referring to the superconducting materials presently available commercially, is effected virtually only by liquid helium or cold, gaseous helium.

In known cables of he general types mentioned, the conductors are arranged within a tube filled with, or traversed by coolant. The tube itself may also be electrically conducting or be coated with a conducting layer. The cooling power required for the cooling of the conductor should be kept as small as feasible and coolant losses should be avoided as much as feasible. For these reasons the conductors and the coolant used for cooling the conductors must be thermally insulated from the environment of the cable. As a rule, such thermal insulation is provided with the aid of tubular envelopes which surround the conductor and the tube enveloping the conductor. The tubular envelopes, for example, may be designed as radiation shields and may be cooled by a second coolant having a higher temperature than the coolant used for reducing the temperature of the conductor. The interspaces between the tubular envelope, unless filled or traversed by coolant, are preferably evacuated and may contain several additional layers of poor heat-conducting material and reflecting metal layers. These layers, for example, may consist of polyethylene terephthalate foils which may be coated with reflective layers of aluminum.

The tube surrounding the conductors and the further tubes surrounding the first tube are braced against each other by spacer structures. In a known superconducting cable such spacer structures between the tubular radiation shield and the conductor system consist of series of glass discs or ceramic discs (E. C. Rogers and E. R. Edwards in Electrical Review, Vol. 81, 1967, pages 848 to 851). With such disc-shaped spacers, however, the areas of engagement with the tubes whose spacing is to be secured, is relatively large so that the cross section of the material through which heat may enter into the cable assemblies is correspondingly large. This disadvantage can be reduced by spacers that touch the tube walls at only small surface areas. Spacers of this type are proposed in Austrian Pat. application A3726/65 published Jan. 15, 1967. According to this proposal, the spacers were to be formed as inserts made of poor heat-conducting stainless (V2A-) steel but no details were disclosed.

Aside from deeply cooled or cryogenically cooled cables, spacer structures of poor heat conducting material between coaxial tubes are also desirable in cables or ducts for the transportation of liquid low-boiling gases in which a tube surrounded by further tubes serves to transport the liquified gases.

It is an object of our invention to further improve such coaxial arrangements of tubular members for cryogenically coolable cables or the above-mentioned analogous other purposes; and it is also an object of the invention to devise a spacer structure of improved design and ease of assembling suitable for use in such coaxial arrangements.

Another, more specific object of our invention, relating to the above-mentioned coaxial arrangement of tubular members and/or spacers for such arrangements, is to further minimize the areas of engagement between the spacer and the tube walls.

It is also an object of the invention to design a spacer for use with coaxial tubular arrangements in such a manner that the connecting paths between the respective inner and outer tubular members of respectively different temperatures are greatly extended.

To achieve these objects, and in accordance with our invention, we provide spacer structures of poor heat conducting material which are axially spaced from each other in the longitudinally extending, annular interspace between inner and outer tubes, each spacer having a ring portion which surrounds the inner tubular member when the coaxial arrangement is in assembled condition and which has inwardly directed bosses or other protrusions angularly spaced from each other for facing and contacting the inner tubular member in assembled condition. The spacer structure surrounds the entire periphery of the inner tube and is equipped with three spoke members. These are joined with the ring portion and protrude therefrom in a radially outward direction for engagement with the inner periphery of the outer tubular member when the arrangement is in assembled condition. The three spoke members are angularly spaced about 120° from each other and are preferably spaced about 60° from the above-mentioned bosses.

In a coaxial arrangement of tubes, a spacer structure according to the invention affords the advantage that the bosses, angularly spaced about 120° from each other, and the spoke members, also spaced about 120° from each other, coact in securing reliable three-point bracing of the tubes relative to each other, while simultaneously the areas of engagement between spacer and tubes are kept extremely small since the inner tube touches the spacer structure only at the bosses and the outer tube touches the spacers only at the outward end of the spoke-shaped supporting elements. Since preferably the spoke-shaped members are spaced, angularly about 60° from the bosses, the longest feasible paths of thermal connection between inner tube and outer tube are attained.

To facilitate mounting and assembling, the spacer structure is preferably made divisible. We prefer composing each spacer structure of three component parts of which each extends along about one-third of the inner-tube periphery.

In a preferred embodiment of such a spacer, and in accordance with more specific features of our invention, a long connecting path between the two tubes with the aid of a three-component spacer is achieved by having the ring portion of each component part constituted by two ring elements which extend parallel to each other along one-third of the periphery and which carry above-mentioned protrusions or bosses, each of the three component parts being provided with one of the spoke members, this member having a V-shaped configuration. The ends of the ring elements are joined with each other by respective bridge elements extending approximately parallel to the longitudinal axis of the tubes. Each of the two legs of the V-shaped spoke member is joined with one of the respective two ring elements, preferably at the middle of the ring element.

In this preferred embodiment of the spacer structure, the bridge element at one end of the ring elements in each component part of the spacer is preferably provided with two boss-shaped protrusions and has a notch extending along the bridge element on the side facing away from the inner tube, whereas the bridge member at the other end of the ring element has an extension at the side facing away from the inner tube. The notches and extensions of the peripherally adjacent parts of the spacer structure are engageable with each other in tongue-and-groove fashion. This has the advantage that each component part of the spacer is in touch with the inner tube through the bosses at only one end of the ring elements, whereas the same spacer part is supported at the other end of its ring elements upon the next adjacent spacer part.

The component parts of the spacer are suitably fastened on the inner tube, preferably by means of a filamentary member such as a band or wire, which should consist of poor heat-conducting material, for example a band of glass, silk or a steel wire.

Figure 2:
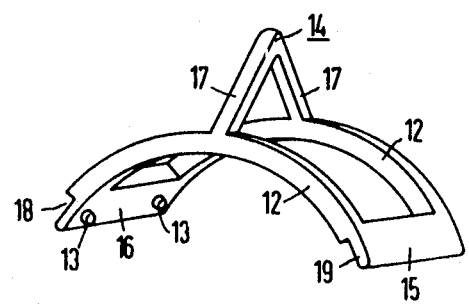

The above-mentioned and further objects, advantages and features of our invention will be described in the following with reference to an embodiment of a coaxial cable structure according to the invention illustrated by way of example on the accompanying drawing in which:

FIG. 1 shows schematically and in cross section a superconducting cable with two different embodiments of a spacer according to the invention; and FIG. 2 shows in schematical perspective a component part of a spacer structure according to a preferred embodiment of the invention.

Referring to FIG. 1, the superconductive cable is provided with a hollow conductor 1 which can comprise, for example, a copper matrix 2 having a plurality of imbedded niobium titanium conductors 3. The conductor 1 is surrounded by a tube 4 made, for example, of stainless steel and through which liquid helium streams during operation of the cable. Liquid helium can also flow within the hollow conductor 1 during operation of the cable. The tube 4 is surrounded by a second tube 5 made for example of aluminum and forming a radiation shield. Second tube 5 is constructed in two parts to facilitate assembly. Two tubes 6 of smaller diameter are joined with tube 5 and carry liquid nitrogen during operation of the cable for cooling the radiation shield. Tube 7 is provided as an outer covering and surrounds tube 5. Tube 7 is also constructed in two parts and can be made, for example, of stainless steel. The two parts of tube 7 are joined together vacuum tight by a welded seam at location 8. During operation of the cable, the intermediate spaces between tubes 4 and 5 and tubes 5 and 7 are evacuated to obtain a thermal insulation. For additional thermal insulation, several layers 9 of poor heat-conductive material are disposed in the intermediate spaces, such material consisting of, for example, aluminum coated polyethylene terephthalate foil or glass fiber material having aluminum foil disposed therein.

Spacers 10 and 11 of poor heat-conductive material are provided between the tubes 4 and 5 and tubes 5 and 7 respectively, each of the spacers being constructed of three parts joined together. One part of spacer 10 is illustrated in FIG. 2. The spacer 10 has a ring-shaped portion which surrounds tube 4; this portion comprising the respective ring segments 12 of the component parts. Each of the ring segments forms approximately a third of the ring. On the sides of the component parts facing the tube 4, there are provided bosses 13 located at 120° intervals for supporting the tube 4. In addition, the spacer 10 has three spokelike supporting portions 14 directed radially to the tube 5. Each component part of the spacer 10 has a supporting element 14 and in the assembled spacer, the elements 14 are spaced 120° from each other and 60° from the protrusions 13.

As illustrated in FIG. 2, each component part of the spacer 10 comprises two ring segments 12 arranged next to each other which form about one-third of the circular ring. Struts 15 and 16 join the ends of the ring segments and are disposed approximately parallel to the longitudinal axis of the cable. The spokelike support elements 14 are constructed in a V-shaped configuration and each leg 17 of the support element 14 is positioned at the center of the corresponding ring segment 12.

The side of the one strut 16 facing the inner-lying tube is provided with two bosses 13, the strut 16 being at one end of the two ring segments 12. On the side of strut 16 facing away from the inner-lying tube, there is provided a notch 18. The strut 15 at the other end of the two ring segments 12 has on its side facing away from the inner-lying tube, an extension 19 constructed to accommodate the notch 18. As illustrated in FIG. 1, notch and extension hold two neighboring component parts of the spacer 10 within each other and so support each other. The tubes 4 and 5 are supported against radial displacement by means of the bosses 13 and the spokelike support elements 14 in the form of a three point support arrangement. Since on each strut 16 of the individual component part there are two bosses 13, the inner-lying pipe is protected against tipping by what collectively constitutes a six-point supporting arrangement. The upper edge of the V-shaped supporting element 14 directed toward the outer lying pipe 5 is advantageously constructed as a cutting means, so that when the poor heat-conductive foil 9 is wound about the tube 4, the cutting means can easily press through this foil material. The foil 9 then lies tight against the supporting element 14, so that the heat-insulating effect of the foil is practically not interrupted.

The three component parts of the spacer 11 disposed between the inner lying tube 5 and the outer lying tube 7 have a configuration similar to that of the spacer 10. Because of the nitrogen tubes 6 which are joined to the tube 5, the form of the individual component parts of spacer 11 are somewhat modified. The ring segments of the component part 20 have a band, so that the latter has no contact with the nitrogen tube 6. The spokelike support elements of the component parts of the spacers 10 and 11 lying above when the cable is in operative position can also be constructed somewhat shorter than the spokelike support elements of the other component parts, so that there is no direct contact between the spokelike support elements of upper-lying component parts and the tubes 5 and 7 respectively. The support elements cannot be omitted from these component parts because, with a displacement of the tube in the radial direction, these supporting elements must perform their function.

Along the length of the cable of FIG. 1 there are provided a row of spacers 10 and 11 spaced from each other. The poor heat-conducting tension bands used to secure the component parts of the spacers on the tubes 4 and 5 are not shown so that a better view is afforded. For example, the bands can be wound around the touching struts of neighboring component parts such that the bands do not touch the inner lying tube.

Other embodiments of spacers of the invention can deviate in details from the preferred embodiment illustrated in FIGS. 1 and 2. For example, the spacers can consist of a unitary member rather component parts, however, this construction requires that the spacer be pushed on the tube. In addition, there is the possibility that instead of two ring segments 12 of a component part, there be provided only a single ring segment which has struts at its ends corresponding to the struts 15 and 16. Instead of the V-shaped supporting element 14, there can be provided a conelike supporting element. Such an embodiment will have as a rule a somewhat lower strength than the construction illustrated in FIGS. 1 and 2. The V-shaped support elements are practical, especially, for mechanical requirements of the cable in the longitudinal direction. Such mechanical requirements occur when the cable cools off, since with cooling, contraction occurs in tube 5 serving as the radiation shield and, to an even greater extent, in the tube 4 through which helium passes, whereas the tube 7 which is at ambient temperature does not undergo a change in length. Because of this contraction produced by cooling, the individual tubes move against each other in a direction along the longitudinal axis of the cable.

Ceramic materials with small heat-conductivity and high immunity to temperature changes are especially suitable as a material for the spacers. Examples of such materials are sirconium-aluminum-silicate, casting porcelain or glass ceramics with small expansion coefficients. In this connection, there is the advantage that ceramic bodies have a good sliding characteristic on metal in high vacuum, so that with cooling, the tube can displace itself with respect to the spacer when it undergoes changes in length. So that a vacuum having a residual pressure of about $10^{16}$ torr can be attained in the intermediate spaces between the tubes 4 and 5 and 5 and 7 for obtaining thermal insulation, it is also advantageous that the ceramic materials have a low vapor pressure and therefore emit practically no gases. In addition to ceramic material, there are synthetic materials which can be used for the spacers, especially polyamides such as nylon.

To those skilled in the art it will be obvious upon a study of this disclosure that our invention permits of various modifications and may be given embodiments other than particularly illustrated herein, without departing from the essential features of he invention and within the scope of the claims annexed hereto.

We claim:

1. A coaxial arrangement of tubular members for cryogenically coolable cables or the like, comprising inner and outer tubular members forming a longitudinally extending, annular interspace between each other, at least one of said tubular members being contactable by coolant passing through the cable, and spacer structure of poor heat-conducting material disposed in said interspace and contacting said respective tubular members at small areas as compared with the noncontacted surface areas, said spacer structure having a ring portion surrounding the inner one of said tubular members, said ring-shaped portion having inwardly directed and angularly spaced protrusions facing and contacting said inner tubular member, and three spoke members joined with and protruding in a radially outward direction from said ring portion toward engagement with the inner periphery of the outer tubular member, said three spoke members being about 120° peripherally spaces from each other.

2. In a coaxial arrangement according to claim 1, said protrusions being about 120° peripherally spaced from each other, and said spoke members being angularly spaced about 60° from said protrusions.

3. In a coaxial arrangement according to claim 1 said protrusions forming bosses integral with the material of said ring portion.

4. In a coaxial arrangement according to claim 3, said spoke members consisting of material integral with that of said ring portion.

5. In a coaxial arrangement according to claim 1, said spacer structure consisting of three peripherally sequential component parts of which each extends over one-third of the inner-tube periphery, each of said three parts having one of said respective spoke members.

6. In a coaxial arrangement according to claim 5, each of said three component parts of said spacer structure comprising two ring elements extending peripherally along about one-third of the inner-tube periphery in axially spaced relation to each other, and two bridge elements extending parallel to the tube axis and joining said two ring elements at the respective ends there, said ring elements and said bridge elements conjointly forming said ring portion, said spoke member being substantially V-shaped and having its two legs joined with said two ring elements respectively so as to have the V-shape pointing away from said ring elements.

7. In a coaxial arrangement according to claim 6, said V-shaped spoke member having said legs extending from the middle of said respective ring elements.

8. In a coaxial arrangement according to claim 6, said V-shaped spoke member having a tip portion shaped substantially as a rounded knife edge where it engages said outer tubular member.

9. In a coaxial arrangement according to claim 6, each of said two bridge elements of said ring portion having two axially spaced bosses which form said inwardly directed protrusions respectively one of said two bridge members having a marginal notch along its axially extending end, and said other bridge member having a projection along its axially extending end, whereby said notch and projection of respective peripherally adjacent rings are in tongue-and-groove engagement with each other.

10. In a coaxial arrangement according to claim 5, and band means fastening said component parts of said spacer structure upon said inner tubular conductor.